United States Patent
Ishikawa

(10) Patent No.: US 8,252,470 B2
(45) Date of Patent: Aug. 28, 2012

(54) FUEL CELL SYSTEM

(75) Inventor: Tomotaka Ishikawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 320 days.

(21) Appl. No.: 12/600,438

(22) PCT Filed: May 16, 2008

(86) PCT No.: PCT/JP2008/059487
§ 371 (c)(1),
(2), (4) Date: Nov. 16, 2009

(87) PCT Pub. No.: WO2008/146718
PCT Pub. Date: Dec. 4, 2008

(65) Prior Publication Data
US 2010/0167149 A1 Jul. 1, 2010

(30) Foreign Application Priority Data
May 29, 2007 (JP) .................................. 2007-141980

(51) Int. Cl.
H01M 8/04 (2006.01)
H01M 8/02 (2006.01)
(52) U.S. Cl. ......... 429/436; 429/437; 429/442; 429/512
(58) Field of Classification Search .................. 429/444, 429/492, 434, 535, 428, 429, 512, 436, 437, 429/442
See application file for complete search history.

(56) References Cited

U.S. PATENT DOCUMENTS
2002/0146608 A1* 10/2002 Yang et al. ........................ 429/26
2005/0175874 A1* 8/2005 Alessi et al. ..................... 429/26

FOREIGN PATENT DOCUMENTS
DE 11 2007 003 164 T5 11/2009
DE 11 2007 002 603 T5 12/2009
EP 1465281 A * 10/2004
(Continued)

OTHER PUBLICATIONS
Machine Translation of: JP 2007-012556, Kaneko et al., Jan. 18, 2007.*
(Continued)

*Primary Examiner* — Jonathan Crepeau
*Assistant Examiner* — Kenneth Douyette
(74) *Attorney, Agent, or Firm* — Kenyon & Kenyon LLP

(57) ABSTRACT

A temperature sensor detects the temperature of a coolant circulating in a coolant supply system of a fuel cell. A control unit monitors the temperature detected by the temperature sensor. When the temperature of the coolant is higher than a target temperature, the control section switches a rotary valve to a radiator-side flow path so that a radiator cools the coolant, and when the temperature of the coolant is lower than the target temperature, the control section switches the rotary valve to a bypass-side flow path to raise the temperature of the coolant through FC generation so that the temperature detected by the temperature sensor is equal to the target temperature. During the process above, in a low temperature environment, the target temperature is raised to a temperature that is higher than a target temperature during a normal operation, while a heater heats the coolant. Through the above processing, the temperature inside the fuel cell can be prevented from decreasing excessively even in the low temperature environment.

3 Claims, 6 Drawing Sheets

FOREIGN PATENT DOCUMENTS

| | | | |
|---|---|---|---|
| JP | 62297912 A | * | 12/1987 |
| JP | 2002-246053 A | | 8/2002 |
| JP | 2003-036874 A | | 2/2003 |
| JP | 2005-032587 A | | 2/2005 |
| JP | 2005-093117 A | | 4/2005 |
| JP | 2005129448 A | * | 5/2005 |
| JP | 2006-207539 A | | 8/2006 |
| JP | 2006-294499 A | | 10/2006 |
| JP | 2006-294500 A | | 10/2006 |
| JP | 2006-310073 A | | 11/2006 |
| JP | 2007-012556 A | | 1/2007 |
| JP | 2007-115463 A | | 5/2007 |
| WO | WO 2004036675 A2 | * | 4/2004 |

OTHER PUBLICATIONS

Machine Translation of: JP 2006-294500, Tezuka, Oct. 26, 2006.*

* cited by examiner

FUEL CELL SYSTEM

This is a 371 national phase application of PCT/JP2008/059487 filed 16 May 2008, which claims priority of Japanese Patent Application No. 2007-141980 filed 29 May 2007, the contents of which are incorporated herein by reference.

FIELD OF THE INVENTION

The present invention relates to a fuel cell system provided with a fuel cell for generating electrical energy through an electrochemical reaction between hydrogen and oxygen.

BACKGROUND OF THE INVENTION

A polymer electrolyte fuel cell, for example, is known as one of types of fuel cell which produce electrical power utilizing an electrochemical reaction between hydrogen and oxygen. The polymer electrolyte fuel cell includes a stack which is constituted from a plurality of stacked cells. The cells constituting the stack each include an anode (fuel electrode) and a cathode (air electrode), and a solid polymer electrolyte membrane having a sulfonic acid group as an ion exchange group is interposed between each anode and cathode.

A fuel gas containing a fuel gas (hydrogen-enriched reformed hydrogen obtained by reforming hydrogen gas or hydrocarbon) is supplied to the anode, while an oxygen-containing gas (oxidant gas), e.g., air, is supplied to the cathode as an oxidant. Upon the supply of the fuel gas to the anode, hydrogen contained in the fuel gas reacts with a catalyst in a catalyst layer which constitutes the anode, thereby producing hydrogen ions. The produced hydrogen ions pass through the solid polymer electrolyte membrane and electrically react with oxygen in the cathode. Electrical power is thus produced through the electrochemical reaction.

Meanwhile, in fuel cell systems, in an attempt to start a fuel cell system at a low temperature, if water from when the system last stopped still remains in a fuel cell, the remaining water freezes and may cause the system to be unable to start. Even if the system can be started, product water resulting from its own reaction may freeze and cause power generation to stop.

In light of such circumstances, it has been proposed that, in order to prevent product water resulting from an electrochemical reaction from freezing in a fuel cell, in an attempt to start a fuel cell system, when the internal temperature of the fuel cell is equal to or lower than 0 degrees, the drive of a coolant pump is stopped so as to prevent heat exchange between a coolant at a temperature equal to or lower than 0 degrees and the fuel cell, thereby ensuring an operation for raising the internal temperature of the fuel cell, so that the internal temperature rapidly rises to higher than 0 degrees (see JP2003-36874 A).

SUMMARY OF THE INVENTION

In prior art, the drive of the coolant pump is stopped when the internal temperature of the fuel cell is equal to or lower than 0 degrees, and the product water resulting from an electrochemical reaction can thus be prevented from freezing in the fuel cell. However, when the internal temperature of the fuel cell is higher than 0 degrees, the coolant pump is driven. Therefore, in a low temperature environment, the internal temperature of the fuel cell might decrease after reaching a target temperature.

The present invention has been made in light of the problem of prior art, and has an object to prevent an internal temperature of a fuel cell from decreasing excessively in a low temperature environment.

In order to solve the above problem, the present invention provides a fuel cell system including a fuel cell which produces electrical power upon a supply of a reaction gas, in which a temperature of the fuel cell is, in a low temperature environment at a temperature equal to or lower than a predetermined temperature, controlled to be equal to a target temperature that is higher than a target temperature during a normal operation.

Also, the present invention provides a method for controlling a temperature of a fuel cell including a fuel which produces electrical power upon a supply of a reaction gas, including the steps of: supplying a coolant to the fuel cell; detecting a temperature of the coolant; controlling a with respect to the coolant so that the temperature of the coolant is equal to a target temperature; and changing, in a low temperature environment at a temperature equal to or lower than a predetermined temperature, a temperature of the fuel cell to be equal to a target temperature that is higher than a target temperature during a normal operation.

With such a configuration, the temperature of the fuel cell is controlled to be the predetermined temperature during the normal operation, and in the low temperature environment, the temperature of the fuel cell is controlled to be the target temperature set at a temperature that is higher than the target temperature during the normal operation. Therefore, heat energy of the coolant can be stored even in a low temperature environment, and as a result, the temperature of the coolant can be prevented from decreasing excessively.

The fuel cell system according to the present invention includes: a coolant supplier for supplying a coolant to the fuel cell; and a coolant controller for controlling a heat exchange amount with respect to the coolant so that a temperature of the coolant is equal to a target temperature, in which the coolant controller controls the temperature of the coolant to be equal to the target temperature that is higher than the target temperature during the normal operation in the low temperature environment.

With such a configuration, during the process of controlling the heat exchange amount with respect to the coolant so as to have the temperature of the coolant in the coolant supply system equal to the target temperature, the target temperature for the low temperature environment is set higher than that during the normal operation. Therefore, heat energy of the coolant can be stored even in the low temperature environment, and as a result, the temperature of the coolant can be prevented from decreasing excessively.

The fuel cell system may include the additional elements below.

Preferably, when an electrolyte membrane of the fuel cell is slightly dry, the coolant controller keeps the target temperature at the target temperature during the normal operation even in the low temperature environment.

With such a configuration, when the electrolyte membrane of the fuel cell is slightly dry, the target temperature of the coolant is kept at the target temperature during the normal operation even in the low temperature environment. Accordingly, the electrolyte membrane of the fuel cell can be prevented from being dried excessively.

Preferably, the coolant supplier includes: a cooling path for forming a loop of the coolant for cooling the fuel cell; a coolant pump which is inserted into the cooling path to circulate the coolant; a radiator for radiating heat of the coolant to the outside; and a switching valve for switching a flow path of the coolant flowing into the radiator between a bypass-side flow path which bypasses the radiator and a radiator-side flow path which passes through the radiator, while the coolant controller includes: a heating unit for heating the coolant in the cooling path; a temperature sensor for detecting the temperature of the coolant in the cooling path; and a controller for controlling switching of the switching valve so that a temperature detected by the temperature sensor is equal to the target temperature. When the temperature detected by the temperature sensor indicates the low temperature environment, the coolant controller raises the target temperature and drives the heating unit so that the temperature of the coolant is equal to the raised target temperature.

With such a configuration, the temperature of the coolant for cooling the fuel cell is detected by the temperature sensor, and the temperature detected by the temperature sensor is monitored by the coolant controller, so that, when the temperature of the coolant is higher than the target temperature, the switching valve is switched to the radiator-side flow path so that the radiator cools the coolant, while, when the temperature of the coolant is lower than the target temperature, the switching valve is switched to the bypass-side flow path to raise the temperature of the coolant through FC generation. During the process of controlling the temperature detected by the temperature sensor so as to be equal to the target temperature, in the low temperature environment, the target temperature is raised to be higher than the target temperature during the normal operation, while the coolant is heated by the heating unit, so that heat energy of the coolant can be stored even in the low temperature environment, thereby preventing the temperature of the coolant from decreasing excessively.

The configuration of the "heater unit" is not limited, and any configuration which can raise the temperature of the coolant, e.g., a heat exchanger and a heater can be employed.

DETAILED DESCRIPTION

Figure 1:
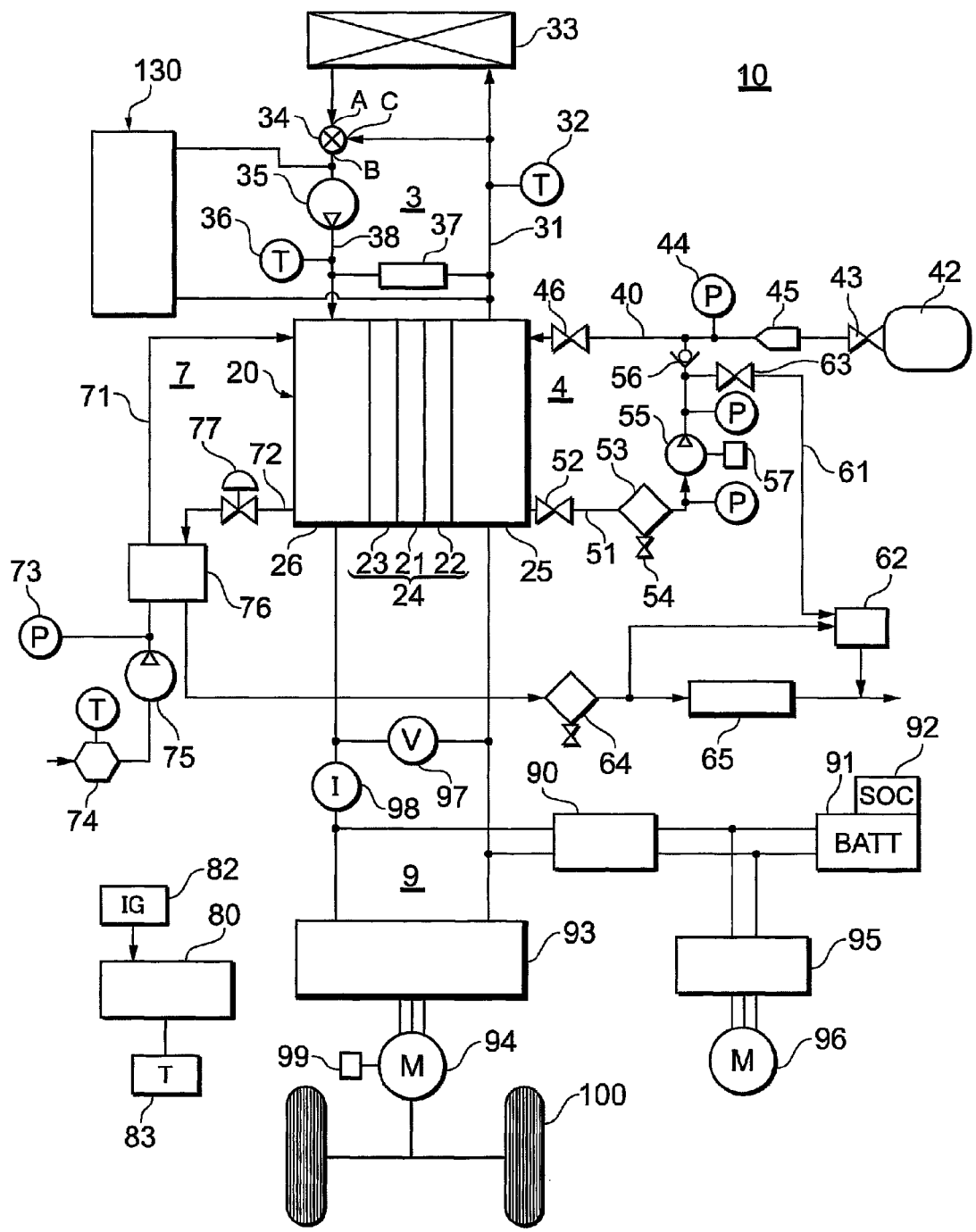
FIG. 1 is a configuration diagram illustrating a fuel cell system according to the present invention.

Now, an embodiment according to the present invention will be described with reference to the attached drawings. FIG. 1 is a configuration diagram illustrating a fuel cell system to which the present invention is applied.

The embodiment below explains an example in which the invention is applied to a fuel cell system mounted on a vehicle, but obviously, the invention is not limited to this example.

In FIG. 1, a fuel cell system 10 includes a fuel gas supply system 4 for supplying a fuel gas (hydrogen gas) to a fuel cell 20, an oxidant gas supply system 7 for supplying an oxidant gas (air) to the fuel cell 20, a coolant supply system 3 for cooling the fuel cell 20, and an electrical power system 9 operable to charge and discharge electrical power produced from the fuel cell 20. Hereinafter, a fuel cell is also referred to as "FC."

The fuel cell 20 includes a membrane electrode assembly (MEA, or the like) in which an anode 22 and a cathode 23 are formed, through, e.g., screen printing, on both the surfaces of a polymer electrolyte membrane 21 constituted by, e.g., a proton conducting ion-exchange membrane formed of, e.g., fluororesin. The membrane electrode assembly 24 is sandwiched, on both of its sides, by separators having flow paths for the fuel gas, oxidant gas and coolant. A groove-like anode gas channel 25 and a groove-like cathode gas channel 26 are respectively formed between one of the separators and the anode 22 and between the other separator and the cathode 23. The anode 22 is formed by providing a fuel electrode catalyst layer on a porous support layer, and the cathode 23 is formed by providing an air electrode catalyst layer on a porous support layer. The catalyst layers of these electrodes each are formed by, e.g., a deposition of platinum particles.

The oxidization reaction represented as below formula (1) occurs at the anode 22, and the reduction reaction represented as below formula (2) occurs at the cathode 23. The electrogenic/electromotive reaction represented as below formula (3) occurs in the entire fuel cell 20.

$$H_2 \rightarrow 2H^+ + 2e^- \tag{1}$$

$$(1/2)O_2 + 2H^+ + 2e^- \rightarrow H_2O \tag{2}$$

$$H_2 + (1/2)O_2 \rightarrow H_2O \tag{3}$$

For the sake of convenience, FIG. 1 schematically illustrates a configuration of a unit cell composed of the membrane electrode assembly 24, the anode gas channel 25, and the cathode gas channel 26. However, a stack structure in which plural unit cells (cell group) are connected in series via the above-described separators is actually provided.

The coolant supply system 3 in the fuel cell system 10 is provided with: a cooling path 31 for circulating a coolant; a temperature sensor 32 for detecting the temperature of the coolant discharged from the fuel cell 20; a radiator (heat exchanger) 33 for radiating heat of the coolant to the outside; a rotary valve 34 for performing switching of a flow path for the coolant flowing into the radiator 33 between a bypass-side flow path (C-side) which bypasses the radiator 33 and a radiator-side flow path (A-side) which passes through the radiator 33; a coolant pump 35 for pressurizing and circulating the coolant; a temperature sensor 36 for detecting the temperature of the coolant to be supplied to the fuel cell 20; an ion exchanger 37 for removing ions dissolved in the coolant; and a cooling path 38 which forms a loop for circulating the coolant together with the cooling path 31, and is also provided with a heating unit 130 for heating the coolant even in a low temperature environment.

Figure 2:
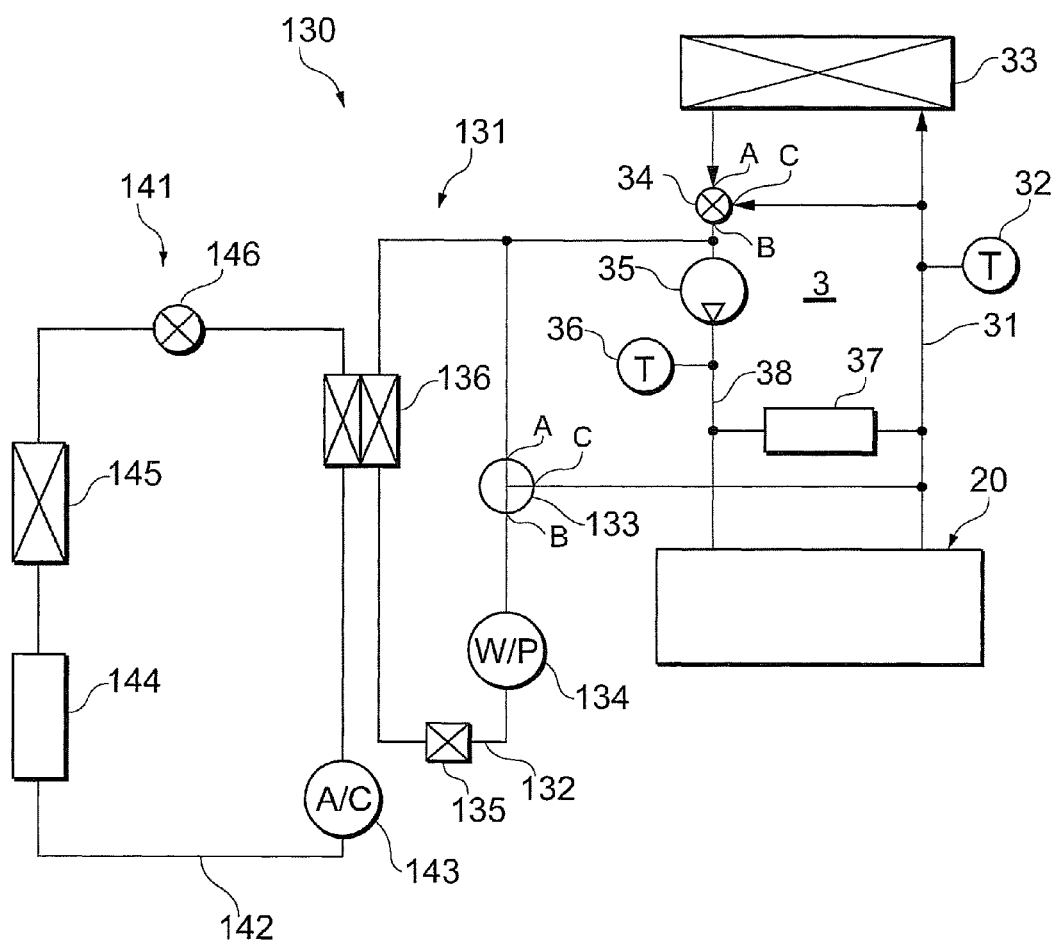
FIG. 2 is a block diagram illustrating an FC cooling circulation system and an air circulation system according to the invention.

As depicted in FIG. 2, the heating unit 130 is configured to include an FC coolant circulation system 131 and an air circulation system 141. The FC coolant circulation system 131 includes a coolant circulation path 132 connected to the cooling path 31 and to the cooling path 38. A three-way valve 133, a water pump 134, a heating calorifier 135 and a water coolant heat exchanger 136 are arranged in the coolant circulation path 132.

The three-way valve 133 is switched to a route that connects a port A to a port B in accordance with a control signal from a control unit 80 in a "short-circuit" mode, and is switched to a route that connects the port B to a port C in accordance with a control signal from the control unit 80 in an FC connection mode. When the three-way valve 133 is switched in accordance with the shot-circuit mode, the flow of the coolant into the coolant circulation path 132 is interrupted, whereby the heating unit 130 is thermally separated from the coolant supply system 3.

Meanwhile, the three-way valve 133 is switched in accordance with the "FC connection mode," the water pump 134 is connected to the cooling path 31 via the ports C and B of the three-way valve 133, and a part of the coolant from an outlet of the fuel cell 20 merges with the coolant in the downstream of the rotary valve 34 via the water pump 134 and the heat exchangers 135 and 136.

The water pump 134 pressurizes and circulates the coolant in the coolant circulation path 132. The heat exchangers 135 and 136 subject the coolant in the coolant circulation path 132 to heat exchange with the air in the air circulation system 141 in order to heat the coolant, and supply the heated coolant to the fuel cell 20.

The air circulation system 141 includes an air circulation path 142 for circulating air. In the air circulation path 142, the water coolant heat exchanger 136, an air compressor 143, an internal heat exchanger 144, an outdoor unit 145 and an expansion valve 146 are arranged.

The air compressor 143 has a revolution speed which is controlled in accordance with control signals from the control unit 80, pressurizes air depending on the revolution speed, and supplies the pressurized air to the outdoor unit 145 via the internal heat exchanger 144. The outdoor unit 145 subjects the air supplied from the internal heat exchanger 144 to heat exchange with external air, generating heat radiation, and supplies the air which has been subjected to the heat exchange to the expansion valve 146. The expansion valve 146 adiabatically expands the air delivered from the outdoor unit 145, and delivers the adiabatically-expanded air to the water coolant heat exchanger 136. The water coolant heat exchanger 136 subjects the air delivered from the expansion valve 146 to heat exchange with the coolant in the coolant circulation path 132, thereby heating the coolant.

Returning to FIG. 1, arranged in the fuel gas supply system 4 of the fuel cell system 10 are: a fuel gas flow path 40 for supplying, to the anode gas channel 25, fuel gas (anode gas), e.g., hydrogen gas, from a fuel gas supply unit 42; and a circulation flow path (circulation path) 51 for circulating, in the fuel gas flow path 40, fuel-off gas exhausted from the anode gas channel 25. These gas flow paths constitute a fuel gas circulation system.

The fuel gas supply unit 42 is constituted by, for example, a high-voltage hydrogen tank, hydrogen absorbing alloys and a reformer. Arranged in the fuel gas flow path 40 are: a cutoff valve (main valve) 43 for controlling the outflow of the fuel gas from the fuel gas supply device 42; a pressure sensor 44 for detecting the pressure of fuel gas; an adjustment valve (ejector) 45 for adjusting the fuel gas pressure in the circulation path 51; and a cutoff valve 46 for controlling the fuel gas supply to the fuel cell 20.

The circulation flow path 51 is provided with: a cutoff valve 52 for controlling the supply of fuel-off gas from the fuel cell 20 to the circulation flow path 51; a gas-liquid separator 53 and a discharge valve 54 for removing water contained in the fuel-off gas; a hydrogen pump (circulation pump) 55 for compressing the fuel-off gas which has suffered pressure loss when the fuel-gas passes the anode gas channel 25 to boost the pressure to an appropriate gas pressure and returning the resultant fuel-off gas to the fuel gas flow path 40; and a check valve 56 for preventing the backflow of the fuel gas in the fuel gas flow path 40 to the circulation flow path 51. The hydrogen pump 55 is driven by a motor, whereby the fuel-off gas obtained via the drive of the hydrogen pump 55 merges, in the fuel gas flow path 40, with the fuel gas supplied from the fuel gas supply device 42, and then is supplied to the fuel cell 20 to be reused. Note that the hydrogen pump 55 is provided with a revolution speed sensor 57 for detecting the revolution speed of the hydrogen pump 55.

Also, an exhaust flow path 61 for exhausting the fuel-off gas exhausted from the fuel cell 20 to the outside of a vehicle via a diluter (e.g., a hydrogen-concentration reduction unit) 62 is arranged to branch off from the circulation flow path 51. The exhaust flow path 61 is provided with a purge valve 63 which enables exhaust control of fuel-off gas. Circulation in the fuel cell 20 is repeated with the opening and closing of the purge valve 63, thereby discharging the fuel-off gas, the impurity concentration of which has been increased, to the outside while introducing new fuel gas, so that the reduction of a cell voltage can be prevented. Also, pulsation is generated in an internal pressure of the circulation flow path 51, thereby removing water stored in the gas flow path.

Meanwhile, arranged in the oxidant gas supply system 7 of the fuel cell system 10 are: an oxidant gas flow path 71 for supplying oxidant gas (cathode gas) to the cathode gas channel 26; and a cathode-off gas flow path 72 for exhausting cathode-off gas exhausted from the cathode gas channel 26. The oxidant gas flow path 71 is provided with an air cleaner 74 for taking in air from an atmosphere and an air compressor 75 for compressing the air taken in and sending the compressed air, as oxidizer gas, to the cathode gas channel 26. A revolution speed sensor 73 for detecting the revolution speed of the air compressor 75 is provided for the air compressor 75. A humidifier 76 for performing humidity exchange is provided between the oxidant gas flow path 71 and the cathode-off gas flow path 72.

The cathode-off gas flow path 72 is provided with a pressure regulating valve 77 for adjusting the exhaust pressure of the cathode-off gas flow path 72, a gas-liquid separator 64 for removing water in cathode-off gas, and a muffler 65 for absorbing exhaust sound of cathode-off gas. The cathode-off gas exhausted from the gas-liquid separator 64 is divided. One of the resultant flows the cathode-off gas flows into the diluter 62, and is diluted by being mixed with the fuel-off gas remaining in the diluter 62, whereas the other flow of the cathode-off gas is subjected to sound absorption by the muffler 65, and is mixed with the gas, which has been subjected to dilution via mixture by the diluter 62, so as to be exhausted to the outside of a vehicle.

Connected to the electrical power system 9 in the fuel cell system 10 are: a DC-DC converter 90 in which an output terminal of a battery 91 is connected to the primary side while an output terminal of the fuel cell 20 is connected to the secondary side; the battery 91 serving as a secondary battery for storing surplus power; a battery computer 92 for monitoring the charge status of the battery 91; an inverter 93 for supplying AC power to a vehicle driving motor 94 which serves as a load or drive target of the fuel cell 20; an inverter 95 for supplying AC power to each high-voltage auxiliary apparatus 96 in the fuel cell system 10; a voltage sensor 97 for measuring the output voltage of the fuel cell 20; and a current sensor 98 for measuring the output current of the fuel cell 20.

The DC-DC converter 90 subjects the surplus power of the fuel cell 20 or the regenerative power produced through a braking operation on the vehicle driving motor 94 to voltage conversion, and supplies the resultant power to charge the battery 91. Also, in order to compensate for the shortfall in the electrical power produced from the fuel cell 20 with respect to the electrical power required for the vehicle driving motor 94, the DC-DC converter 90 converts the voltage of the power discharged from the battery 91 and outputs the resultant power to the secondary side.

The inverters 93 and 95 convert AC currents into three-phase AC currents to output the three-phase AC currents to the vehicle driving motor 94 and the high-voltage auxiliary unit 96, respectively. The vehicle driving motor 94 is provided with a revolution speed sensor 99 for detecting the revolution speed of the motor 94. A vehicle wheel 100 is mechanically connected to the motor 94 via a differential, which enables the rotation force of the motor 94 to be converted into an impelling force of the vehicle.

The voltage sensor 97 and the current sensor 98 are each used for measuring an AC impedance based on the phase and amplitude of the current with respect to the voltage of a superimposed AC signal in the electrical power system 9. The voltage sensor 97 detects a voltage on the secondary side of the DC-DC converter 90, and accordingly provides a voltage detection signal Se to be supplied to the control unit 80, while the current sensor 98 detects a current on the secondary side of the DC-DC converter 90, and accordingly provides a current detection signal Si to be supplied to the control unit 80.

The control unit 80: is constituted by a general-use computer which is provided with, for example, a CPU (central processing unit), RAM, ROM, and an interface circuit; receives sensor signals from, for example, the temperature sensors 32 and 36, the pressure sensor 44, the revolution speed sensors 57, 73 and 99, and a temperature sensor 83 for detecting an environmental temperature, and signals from the voltage sensor 97, the current sensor 98 and an ignition switch 82; drives each motor in accordance with the status of battery operation, e.g., an electrical power load; adjusts the revolution speed of each of the rotators such as the hydrogen pump 55 and the air compressor 75; and carries out an opening and closing control of each of the valves, an adjustment of the opening degree of each valve, etc.

Moreover, the control unit 80 computes a command regarding a current value and a command regarding a voltage value to the fuel cell 20 based on power Preq required with respect to the fuel cell system 10, calculates an air amount and a gas fuel amount necessary for power generation based on the computation result, and executes processing for controlling the drives of the air compressor 75 and the hydrogen pump 55 in accordance with the calculation result. Furthermore, the control unit 80: receives inputs of the current detection signal Si and the voltage detection signal Se; measures the AC impedance of the fuel cell 20 based on the input current detection signal Si and voltage detection signal Se; estimates the dry state and water amount of the fuel cell 20 based on the measured AC impedance; and based on the estimation result, executes processing for keeping the temperature of the coolant of the fuel cell 20 at a target temperature during the operation, and executes scavenging processing for setting the water amount of the fuel cell 20 to have the optimum value during the stop of operation.

Figure 3:
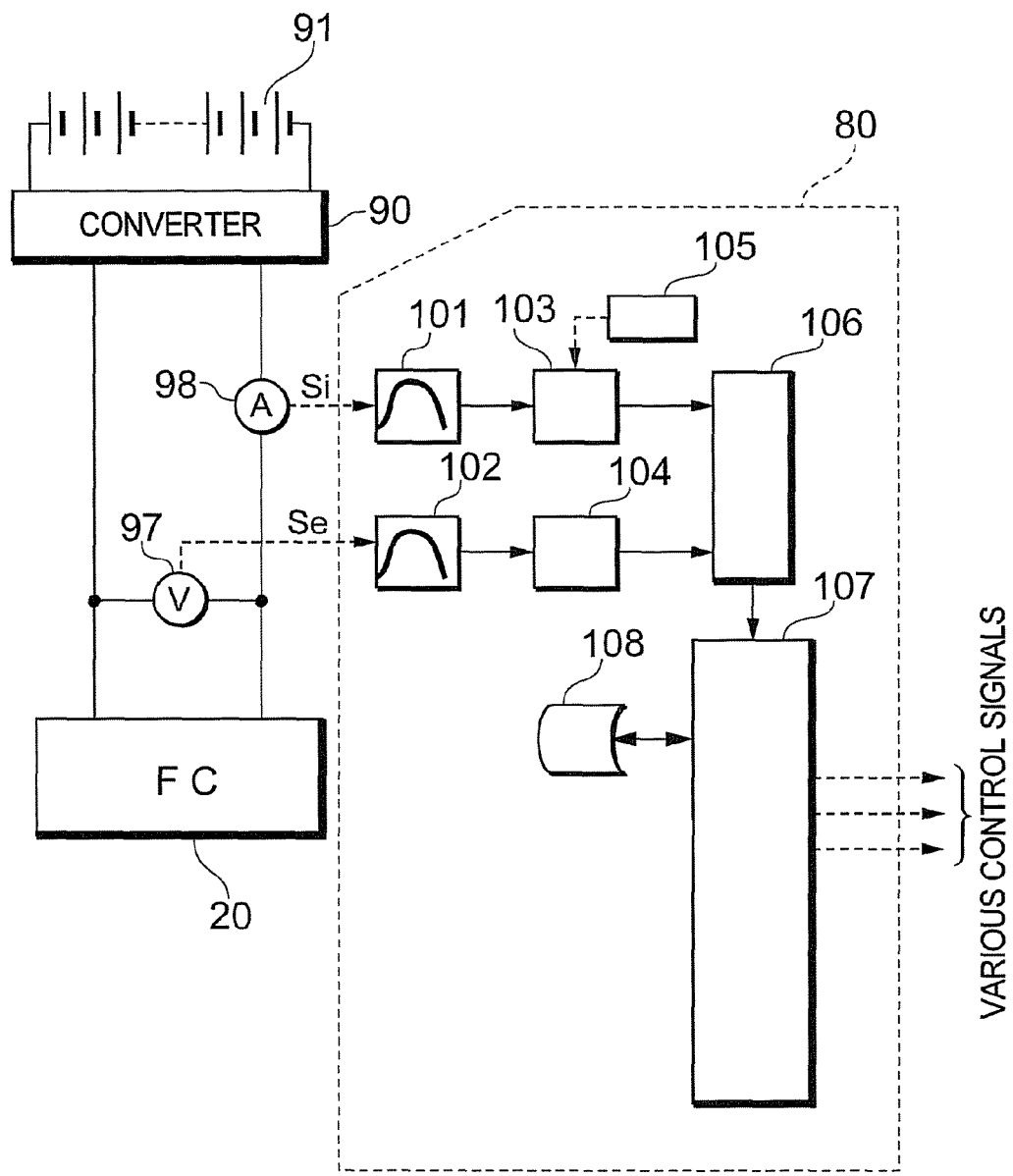
FIG. 3 is a configuration diagram illustrating functional blocks concerning AC impedance measurement according to an embodiment of the invention.

FIG. 3 illustrates functional blocks relating to the measurement of an AC impedance of the fuel cell 20, which are realized in the control unit 80. As depicted in FIG. 3, the control unit 80 includes, as the function blocks relating to the measurement of an AC impendence of the fuel cell 20, filters 101 and 102, FFT processing units 103 and 104, a correction processing unit 105, an impedance analysis unit 106, a judgment unit 107 and a storage device 108.

The filters 101 and 102 each are a band-pass filter, and allow only a frequency component superimposed on a power line by the DC-DC converter 90 to pass therethrough. The filter 101 allows, of the current detection signal Si detected by the current sensor 98, only the frequency component relating to impedance measurements to pass therethrough. The filter 102 allows, of the voltage detection signal Se detected by the voltage sensor 97, only the frequency component relating to impedance measurements to pass therethrough.

The FFT processing sections 103 and 104 perform fast Fourier transform operations respectively with respect to the current detection signal Si and the voltage detection signal Se, and separate respectively the current detection signal Si and the voltage detection signal Se in measurement frequency components into real parts and imaginary parts ($a_i+jb_i$, $a_e+jb_e$).

The impedance analysis unit 106: calculates an impedance X (aX+jbX) based on the voltage detection signal and current detection signal which have been subjected to FFT processing; obtains the distance from an origin point on a complex plane (effective value) $r (=\sqrt{(aX)^2+(bX)^2})$ and a phase angel $\theta(=\tan^{-1}(b/a))$; and obtains an AC impedance in an AC signal having an applied frequency.

The correction processing unit 105 corrects phase delays and gain variations which are caused in accordance with filter characteristics of the respective filters 101 and 102. The correction processing unit 105 corrects coefficients ($a_i$, $b_i$, $a_e$, $b_e$) of the real parts and imaginary parts in the FFT processing units 103 and 104 based on the phase delays and gain variations of the filters 101 and 102 which have been measured in advance. With this correction processing, the actual voltage detection signal and current detection signal which, both of which exclude the phase delays and gain variations caused in accordance with the filter characteristic, are obtained.

The judgment unit 107 stores the effective value and phase angle obtained in the impedance analysis unit 106 or real parts and imaginary parts ($aX_{f1}$, $bX_{f1}$) ($aX_{f2}$, $bX_{f2}$) on a complex plane in two different frequencies f1 and f2 in the storage device 108. In order to obtain the resistance overvoltage and diffusion overvoltage of the fuel cell 20, an impedance curve in a complex plane is obtained through a geometric calculation based on two points in the complex plane. The resistance value in the case of a frequency of 0 is regarded as a resistance of an electrolyte membrane, and the resistance value in the case of a frequency being infinite is regarded as a resistance corresponding value of an activation overvoltage and a diffusion overvoltage.

Note that, while a superimposed AC signal is being varied in terms of frequencies, an impedance is obtained for each frequency so as to store the obtained frequency, whereby an impedance curve can be obtained without performing any special geometric calculation.

Figure 6:
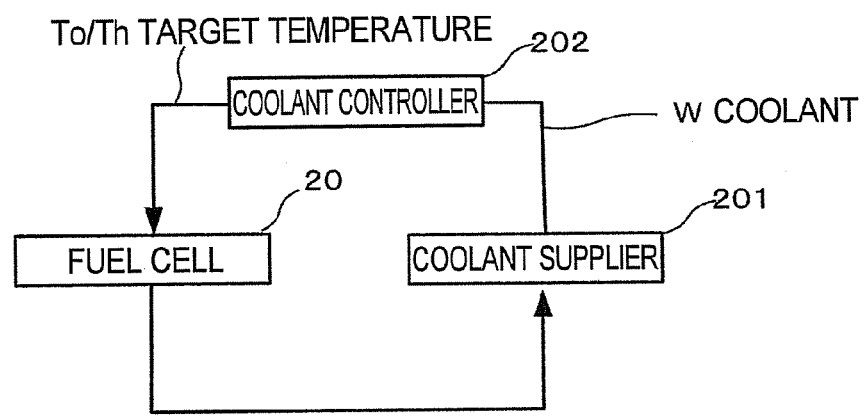
FIG. 6 is a configuration diagram illustrating functional blocks according to the invention.

FIG. 6 is a functional block diagram illustrating internal temperature control of a fuel cell according to the present invention.

As depicted in FIG. 6, the fuel cell system of the invention includes, as functional blocks, a coolant supplier 201 for supplying a coolant W to the fuel cell 20, and a coolant controller 202 for controlling a heat exchange amount with respect to the coolant W so that the temperature of the coolant W is equal to a target temperature. The coolant controller 202 has the feature of controlling the temperature of the coolant W so that, in a low temperature environment, the temperature of the coolant W is equal to a target temperature Th that is higher than a target temperature To during the normal operation.

The coolant supplier 201 corresponds to the cooled reactor 31, the coolant pump 35, the radiator 33, the rotary valve 34, and the bypass flow path through which the coolant flows by switching the rotary valve 34 to the C side, in the configuration depicted in FIG. 2.

The coolant controller 202 corresponds to the heating unit 130 provided with the FC coolant circulation system 131 and the air circulation system 141, the temperature sensor 32, and the control unit 80 (see FIG. 1). When the temperature detected by the temperature sensor 32 indicates a low temperature environment, the coolant controller 202 functions to raise the target temperature for the internal temperature of the fuel cell 20 (to Th) and to drive the heating unit 130 so as to set the temperature of the coolant W to the raised target temperature Th.

Next, the specific content of processing for FC water temperature control carried out by the control unit 80 will be described in accordance with the diagram illustrating the operation in FIG. 4 and the flowchart in FIG. 5.

First, the control unit 80 refers to a detection signal of the temperature sensor 83 at Step S1, and judges whether or not the relevant operation is carried out in a low temperature environment at Step S2. Whether or not the operation is carried out in a low temperature environment is judged based on comparison with a predetermined threshold temperature. Although this threshold temperature is, e.g., 0 degrees, the threshold temperature can be widely changed depending on the characteristics of the coolant and the operation conditions of the system.

As a result, if it is determined that the operation is not in a low temperature environment (S2/NO), heat storage processing of the invention is not needed, and therefore, the operation is carried out in the normal mode. More specifically, at Step S3, the control unit 80 sets a flag for operating the fuel cell system in the normal mode. Here, the normal mode is a mode for controlling an FC water temperature (temperature of the coolant) at a first target temperature Tx (T3<Tx<T4. Here, T3 is a temperature that is higher than a temperature T1 for switching the three-way valve 133 from the FC connection side to the short-circuit side and a temperature T2 for switching the cooling water pump 35 from high revolution to low revolution (T1, T2<T3)).

Meanwhile, if it is determined that the operation is in a low temperature environment (S2/YES), the operation in the heat storage mode is carried out, executing heat storage processing of the invention. In other words, at Step S4, the control unit 80 sets a flag for operating the fuel cell system in the heat storage mode. Here, the heat storage mode is a mode for controlling the FC water temperature (temperature of the coolant) at a second target temperature Ty (T4<Ty<T5).

Then, the control unit 80 shifts to a temperature control which is carried out until the target temperature resulting from the above setting is reached, and then to another temperature control which is carried out after that target temperature is reached, while monitoring the temperature of the coolant flowing in the fuel cell 20.

First, the control unit 80 receives, from the temperature sensor 32, the temperature of the coolant at the outlet side of the fuel cell 20 (S5), and judges whether or not the temperature (water temperature) detected by the temperature sensor 32 has reached the temperature T3 (S6). As a result, if the temperature (water temperature) detected by the temperature sensor 32 has not reached the temperature T3 (S6/NO), the control unit 80 waits until the temperature of the fuel cell rises to approximately the control target temperature due to the power generation of the fuel cell 20.

In other words, the control unit 80 drives the cooling water pump 35 at high revolution (S7), switches the three-way valve 133 to attain a short-circuit mode, thereby interrupting the flow of the coolant into the coolant circulation path 132 (S8). The control unit 80 then switches the rotary valve (RV) 34 to the bypass flow path side (S9). As a result, the temperature of the coolant rises gradually with FC power generation. Subsequently, the control unit 80 waits for a predetermined time (S10/NO), and if a predetermined time has elapsed (YES), the control unit 80 returns to Step S5.

At Step S6, the control unit 80 shifts to temperature maintenance control in accordance with the target temperature set at Step S3 or S4 on the condition that the temperature (water temperature) detected by the temperature sensor 32 has reached the temperature T3 or that the temperature (water temperature) detected by the temperature sensor 32 has exceeded the temperature T3.

First, the control unit 80 turns on the air compressor (AC) 143 (S11), and switches the cooling water pump 35 from high revolution to low revolution (S12). The control unit 80 then switches the three-way valve 133 to attain an FC connection mode at Step S13. In other words, the control unit 80 switches the three-way valve 133 so that the B and C sides are connected in FIGS. 1 and 2. With this switching, a part of the coolant from the outlet of the fuel cell 20 merges with the coolant in the downstream of the rotary valve 34 via the water pump 134 and the heat exchangers 135 and 136.

Subsequently, the control unit 80 proceeds to Step S14, and judges whether or not the operation is in the normal mode based on the set flag. If it is determined that the operation is in the normal mode (S14/YES), the control unit 80 shifts to temperature control for keeping the fuel cell at the first target temperature in the normal mode, and if the operation is in the heat storage mode (S14/NO), the control unit 80 shifts to temperature control for keeping the fuel cell at the second target temperature in the heat storage mode.

In the normal mode, the control unit 80 judges whether or not the temperature (water temperature) detected by the temperature sensor 32 is higher than the temperature T4 (S15), and if the temperature (water temperature) detected by the temperature sensor 32 is lower than the temperature T4 (NO), the control unit 80 waits until the temperature of the fuel cell rises. On the other hand, if the temperature (water temperature) detected by the temperature sensor 32 is higher than the temperature T4 (YES), the control unit 80 determines that the upper limit (T4) of the first target temperature has been reached, and switches the rotary valve 34 to the radiator-side flow path, whereby the radiator 33 cools the coolant (S16). Switching to the radiator-side flow path rubs off the heat of the coolant, whereby the temperature of the fuel cell starts to decrease.

Next, the control unit 80 judges whether or not the temperature (water temperature) detected by the temperature sensor 32 is lower than the temperature T4 (S17), and if the temperature (water temperature) detected by the temperature sensor 32 is lower than the temperature T4 (Yes), the control unit 80 further judges whether or not the temperature (water temperature) detected by the temperature sensor 32 is lower than the temperature T3 (S18). If the temperature (water temperature) detected by the temperature sensor 32 is lower than the temperature T3 (YES), the control unit 80 determines that the temperature (water temperature) detected by the temperature sensor 32 does not fall within the range of the first target temperature, and switches the rotary valve 34 to the bypass-side flow path (S19). As a result, the temperature of the coolant gradually rises with FC power generation.

After that, the control unit 80 judges whether or not the operation ends (S20). If the operation ends (YES), the control unit 80 ends the processing of the current routine; on the other hand, if the operation is continued (NO), the control unit 80 detects the environmental temperature from the temperature sensor 83 (S21), and judges whether or not the environmental temperature indicates a low temperature environment at Step S22. As a result, if it can be determined that the environmental temperature has decreased and indicates a low temperature environment (YES), the control unit 80 determines that the heat storage processing of the invention should be executed, and proceeds to Step S4 for the shift to the heat storage mode.

On the other hand, if it is determined that the environmental temperature does not indicate a low temperature environment (NO), the control unit 80 returns to Step S11 in order to carry out the temperature control in the normal mode, and repeats the processing of Steps S11 to S22, thereby controlling the FC water temperature (temperature of the coolant) to fall within the range of the first target temperature Tx.

Meanwhile, at Step S14, if it is determined that the operation is in the heat storage mode (NO), the temperature control for keeping the fuel cell at the second target temperature in the heat storage mode is carried out. In other words, the control unit 80 waits until the temperature (water temperature) detected by the temperature sensor 32 becomes higher than the temperature T5 while judging whether or not the temperature (water temperature) detected by the temperature sensor 32 is higher than the temperature T5 (NO). If the temperature (water temperature) detected by the temperature sensor 32 is higher than the temperature T5 (YES), it is determined that the upper limit (T5) of the second target temperature has been reached, and switches the rotary valve 34 to the radiator-side flow path, thereby cooling the coolant by the radiator 33 (S24).

Next, with the coolant that has been cooled by the radiator 33, the control unit 80 judges whether or not the temperature (water temperature) detected by the temperature sensor 32 is lower than the temperature T5 (S25), and if the temperature (water temperature) detected by the temperature sensor 32 is lower than the temperature T5 (YES), the control unit 80 judges whether or not the temperature (water temperature) detected by the temperature sensor 32 is lower than the temperature T4 (S26). If the temperature (water temperature) detected by the temperature sensor 32 is lower than the temperature T4 (YES), the control unit 80 determines that the temperature (water temperature) detected by the temperature sensor 32 does not fall within the range of the second target temperature, and switches the rotary valve 34 to the bypass flow path side (S27). As a result, the temperature of the coolant gradually rises with FC generation.

The control unit 80 then judges whether or not the operation ends (S28), and if the operation ends (YES), the control unit 80 ends the processing of the current routine.

If the operation is continued (NO), the control unit 80 measures the AC impedance of the fuel cell, thereby estimating the water amount at Step S29. In other words, after an AC signal is superimposed on a power line by the DC/DC converter 90, the control unit 80: receives inputs of the current detection signal Si and the voltage detection signal Se from the voltage sensor 97 and the current sensor 98; measures the AC impedance of the fuel cell 20 based on the input current detection signal Si and voltage detection signal Se; and judges whether or not the measured AC impedance is lower than a predetermined value (S30).

Here, the AC impedance corresponds to an amount of water (hereinafter, referred to as "water amount") that remains in the fuel cell 20. As an AC impedance decreases, the inside of the fuel cell becomes wetter, and as an AC impedance increases, the inside of the fuel cell becomes drier.

As a result, if the measured AC impedance is lower than a predetermined value (YES), the control unit 80 determines that the water amount of the fuel cell certainly has a constant value or more, and repeats the processing of Steps S24 to S30 in order to continue the heat storage mode, thereby controlling the FC water temperature (temperature of the coolant) so as to fall within the range of the second target temperature Tx.

Meanwhile, if the control unit 80 determines that the measured AC impedance is higher than a predetermined value at Step S30, this indicates that the fuel cell is slightly dry. The control unit 80 then changes the flag setting to the normal mode at Step S31, and proceeds to Step S14. More specifically, when the fuel cell is slightly dry even in a low temperature environment, an operation based on a setting with a slightly high coolant temperature in the heat storage mode is prohibited, which forcibly leads to the shift to the normal mode.

Figure 4:
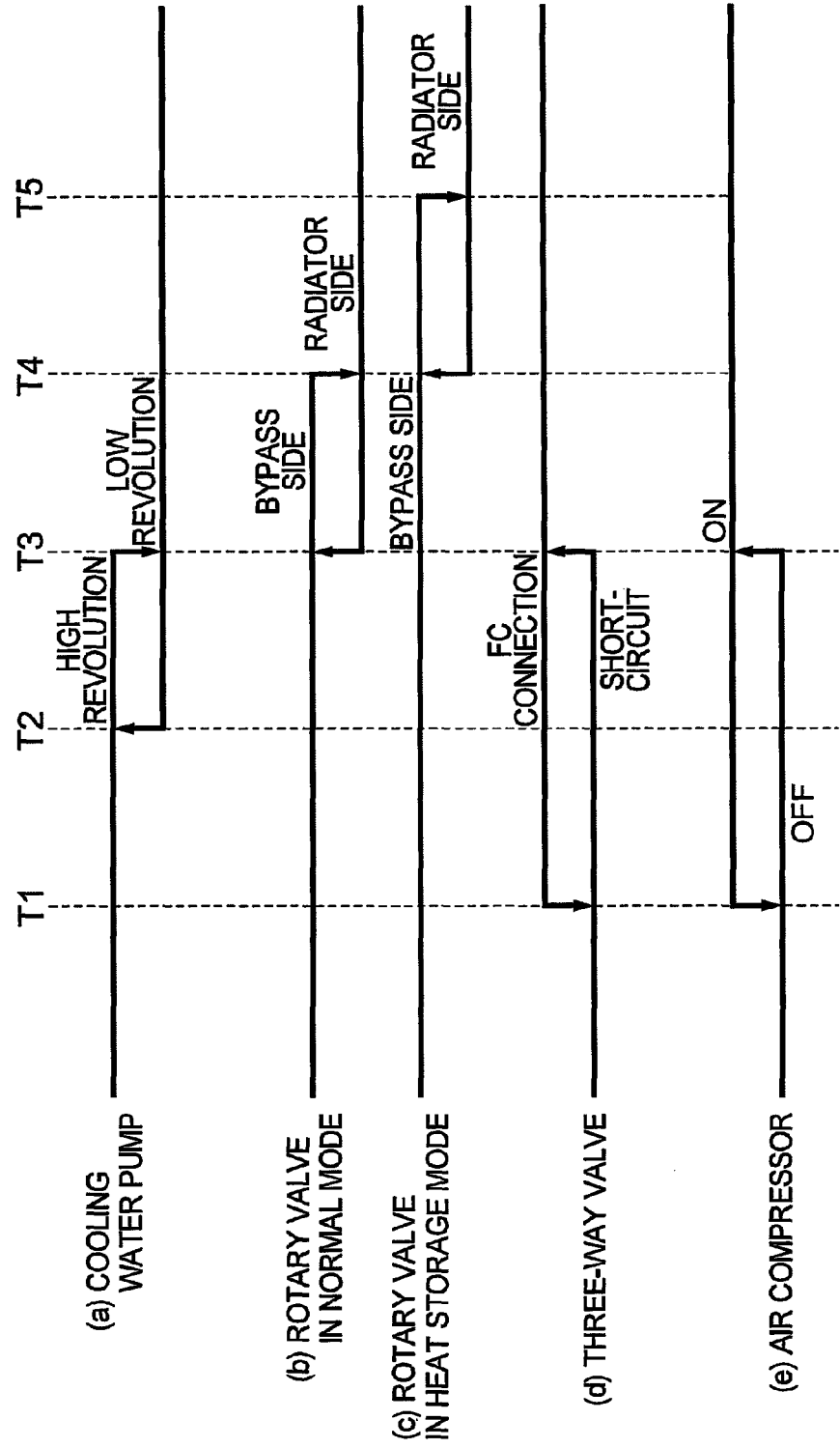
FIG. 4 is a diagram for explaining an operation of a control unit according to the embodiment of the invention.
Figure 5:
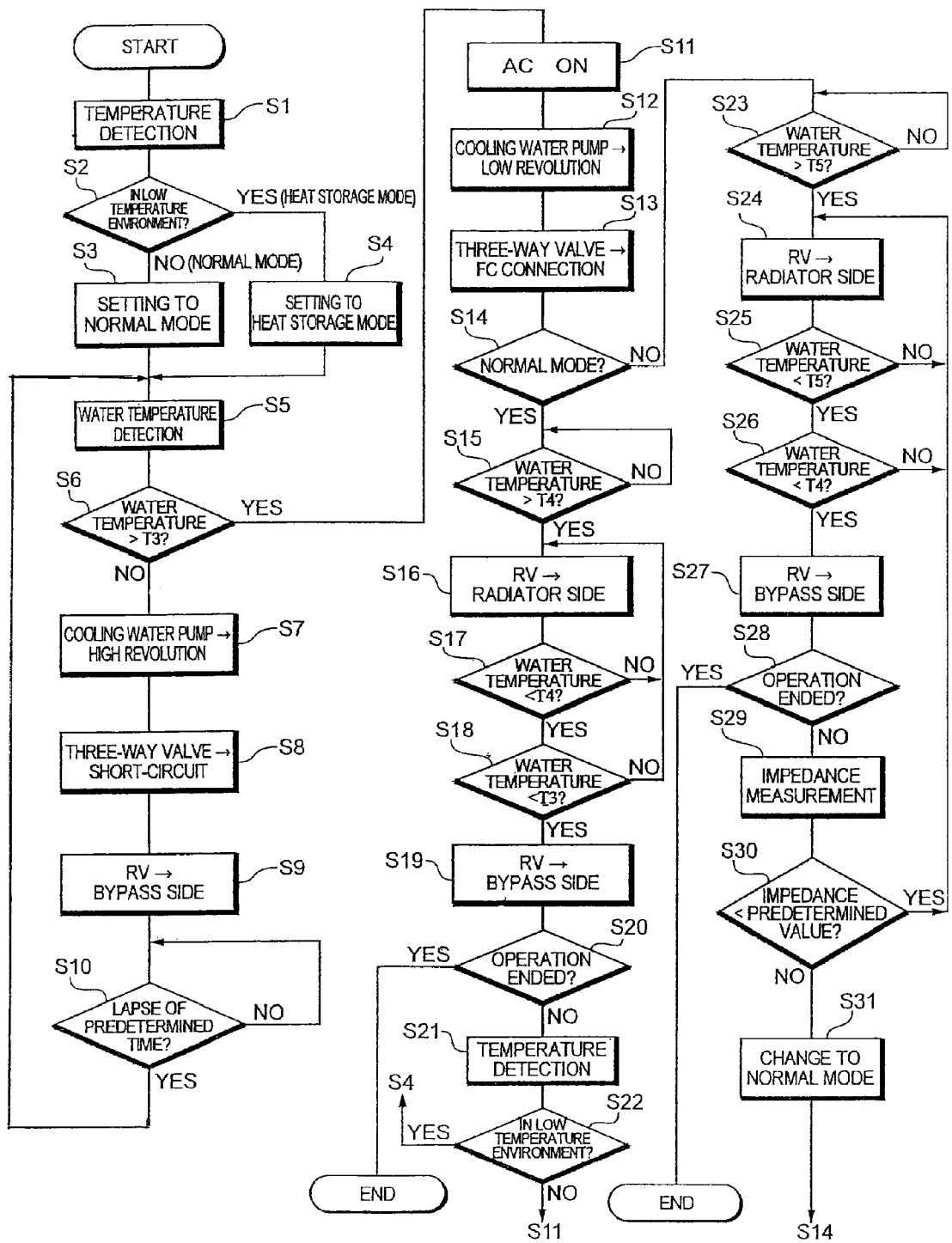
FIG. 5 is a flowchart for illustrating the operation of the control unit according to the embodiment of the invention.

FIG. 4 illustrates the temperature of a coolant that changes in accordance with the above temperature control.

As depicted in FIG. 4, in the case of the normal mode, the temperature of the coolant is kept at the first target temperature between T3-T4. In the case of the heat storage mode, the temperature of the coolant is kept at the second target temperature being higher than the first target temperature between T4-T5.

As described above, according to this embodiment, during the process of controlling the heat exchange amount with respect to the coolant so that the temperature of the coolant in the coolant supply system is equal to the target temperature, in a low temperature environment, the target temperature of the coolant is set to fall within the range of the second target temperature that is higher than the first target temperature. Therefore, heat energy of the coolant can be stored even in a low temperature environment, thereby preventing the temperature of the coolant from decreasing excessively.

According to this embodiment, when the electrolyte membrane of the fuel cell 20 is slightly dry, the target temperature of the coolant is set to fall within the range of the first target temperature, even in a low temperature environment. Accordingly, the electrolyte membrane of the fuel cell 20 can be prevented from being dried excessively.

In this embodiment, although heating of the coolant in the heat storage mode is performed by the heating unit utilizing the air conditioner depicted in FIG. 3, the present invention is not limited to this configuration. Any means may be applied as long as that means has a configuration which can raise the temperature of the coolant.

The fuel cell system of the invention may be applied not only to vehicles but also to all mobile objects that move on land, underground, on the sea, in the sea, in the air, and in space. Obviously, the present invention may be applied to stationary fuel cell systems.

Industrial Applicability

According to the present invention, in a low temperature environment having a temperature that is equal to or lower than a predetermined temperature, the temperature of a fuel cell is controlled to be equal to a target temperature that is higher than the temperature during the a normal operation, and therefore, heat energy of a coolant can be stored even in the low temperature environment, thereby preventing the temperature of the cooing liquid from decreasing excessively.

The invention claimed is:

1. A fuel cell system including a fuel cell which produces electrical power upon a supply of a reaction gas, comprising:
   a coolant supplier for supplying a coolant to the fuel cell; and
   a coolant controller for controlling a heat exchange amount with respect to the coolant so that a temperature of the coolant is equal to a target temperature, wherein
   in a low temperature environment at a temperature equal to or lower than a predetermined temperature, when an amount of water remaining in the fuel cell is equal to or less than a predetermined value, the coolant controller is programmed to control the temperature of the coolant so that the target temperature is higher than a target temperature during a normal operation so as to control a temperature of the fuel cell, while, the amount of water is more than the predetermined value, the coolant controller is programmed to keep the target temperature at the target temperature during the normal operation.

2. The fuel cell system according to claim 1, wherein:
the coolant supplier comprises:
- a cooling path for forming a loop of the coolant for cooling the fuel cell;
- a coolant pump which is inserted into the cooling path to circulate the coolant;
- a radiator for radiating heat of the coolant to the outside; and
- a switching valve for switching a flow path of the coolant flowing into the radiator between a bypass-side flow path which bypasses the radiator and a radiator-side flow path which passes through the radiator;

the coolant controller comprises:
- a heating unit for heating the coolant in the cooling path;
- a temperature sensor for detecting the temperature of the coolant in the cooling path; and
- a controller for controlling switching of the switching valve so that a temperature detected by the temperature sensor is equal to the target temperature; and when the temperature detected by the temperature sensor indicates the low temperature environment, while the target temperature is controlled to be a target temperature that is higher than a target temperature during a normal operation, the coolant controller is programmed to drive the heating unit so that the temperature of the coolant is equal to the target temperature that is higher than the target temperature during the normal operation.

3. A method for controlling a temperature of a fuel cell system including a fuel which produces electrical power upon a supply of a reaction gas, comprising the steps of:
- supplying a coolant to the fuel cell;
- detecting a temperature of the coolant;
- controlling a heat exchange amount with respect to the coolant so that the temperature of the coolant is equal to a target temperature; and
- in a low temperature environment at a temperature equal to or lower than a predetermined temperature, when an amount of water remaining in the fuel cell is equal to or less than a predetermined value, changing the temperature of the coolant so that the target temperature is higher than a target temperature during a normal operation so as to control a temperature of the fuel cell, and the amount of water is more than the predetermined value, keeping the target temperature at the target temperature during the normal operation.

* * * * *

UNITED STATES PATENT AND TRADEMARK OFFICE
CERTIFICATE OF CORRECTION

PATENT NO. : 8,252,470 B2
APPLICATION NO. : 12/600438
DATED : August 28, 2012
INVENTOR(S) : Tomotaka Ishikawa It is certified that error appears in the above-identified patent and that said Letters Patent is hereby corrected as shown below:

| Column | Line | |
|---|---|---|
| 8 | 19 | Change "$\theta(=\tan^1(b/a))$" to --$\theta(=\tan^{-1}(b/a))$--. |

Signed and Sealed this
Fifteenth Day of January, 2013

David J. Kappos
*Director of the United States Patent and Trademark Office*